Figures 1, 2:
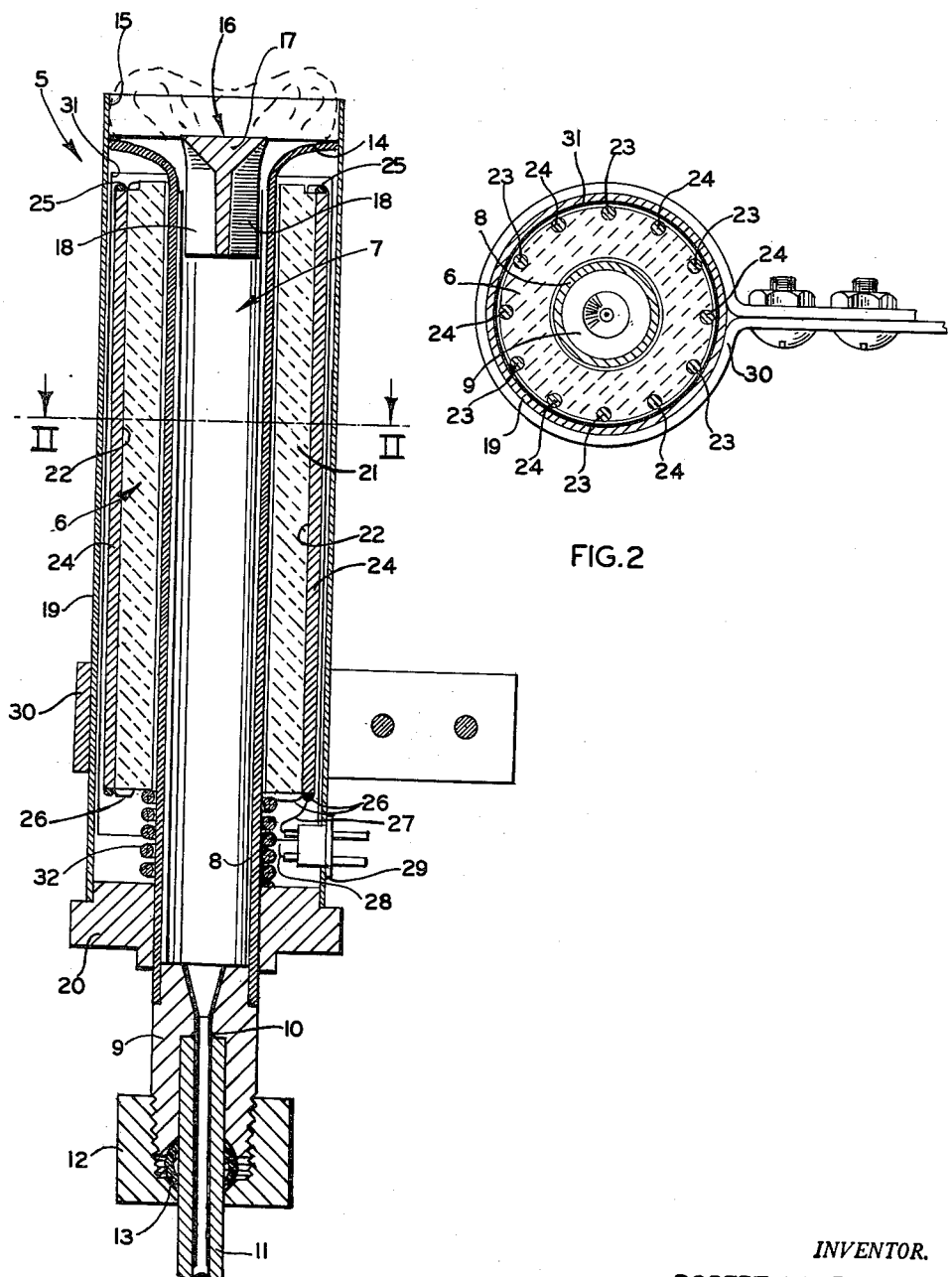

Jan. 16, 1962    R. W. FRITTS    3,017,445
BURNER-THERMOELECTRIC GENERATOR ASSEMBLY
Filed July 7, 1959

INVENTOR.
ROBERT W. FRITTS
BY
Carpenter Abbott Coulter & Kinney
ATTORNEYS

United States Patent Office 3,017,445
Patented Jan. 16, 1962

3,017,445
BURNER-THERMOELECTRIC GENERATOR ASSEMBLY
Robert W. Fritts, Arden Hills, Minn., assignor to Minnesota Mining and Manufacturing Company, St. Paul, Minn., a corporation of Delaware
Filed July 7, 1959, Ser. No. 825,498
8 Claims. (Cl. 136—4)

This invention relates to improvements in burner-thermoelectric generator assemblies.

There are certain applications in which it is particularly desirable to provide a source of thermoelectric energy of relatively high voltage and relatively low amperage. One such appliaction is in the cathodic protection of domestic storage water heaters. Cathodic protection of equipment of this type can be afforded by means of a zinc anode maintained at a potential of about one volt positive with respect to the iron wall of the tank. This potential difference, with a current of approximately 10 milliamperes, affords adequate cathodic protection for most glass lined steel water heater storage tanks of the domestic type.

In the case of gaseous fuel burning domestic water heaters it is desirable to provide the aforementioned potential without resort to the local electric utility, for example by the use of a thermoelectric generator having hot junction means heated by the flame of a constantly operating gas burner. Heretofore the thermoelectric generators having an electrical output sufficient for cathodic protection purposes required a burner flame which generated more heat than was lost from the tank during prolonged standby periods. Such a heat input requirement rendered said generators unsatisfactory for cathodic protection purposes because of the danger of overheating during such standby periods.

It is a general object of the present invention to provide an improved burner-thermoelectric generator assembly which is particularly well adapted to supply thermoelectric energy at relatively high voltage and relatively low current values.

Another object of the invention is to provide an improved assembly of the aforementioned character having embodied therein a novel, compact and highly efficient thermoelectric generator which requires only a relatively small heat input.

Another object of the invention is to provide an improved assembly of the class described having embodied therein a low input, non-clogging gaseous fuel burner, as well as novel deflector and heat collecting draft shield means affording maximum utilization of the heat generated and protection against outage from drafts.

A more specific object of the invention is to provide a novel burner-thermoelectric generator assembly in which the thermoelectric generator is annular in form and is enclosed within an hermetically sealed chamber in surrounding relationship with a coaxially disposed burner structure.

Other and further objects and advantages of the invention will become apparent as the description proceeds, reference being had to the drawing accompanying and forming a part of this specification and illustrating one embodiment of the invention. In the drawing:

FIGURE 1 is an axial sectional view of a burner-thermoelectric generator structure constructed in accordance with the inventive concept; and FIGURE 2 is a sectional plan view taken along the line II—II of FIGURE 1.

Referring more particularly to the drawing, the form of the invention selected for illustration in FIGURE 1 takes the form of an improved burner-thermoelectric generator assembly 5 comprising a tubular thermopile structure 6 in surrounding relationship with a miniature gas burner 7.

The burner 7 comprises a tubular throat portion 8 having its lower end closed by a fuel inlet fitting 9 formed with a restricted fuel metering orifice 10 and having means for connection with a fuel supply conduit 11, for example by the connector nut 12 and the compression fitting 13. The throat portion 8 terminates at its upper ends in a flame port and is formed at said end with a radially outwardly directed circular annular flange or end wall 14 which terminates in a coaxial tubular cylindrical flange 15 to form a generally cup-shaped structure surrounding the flame port of the upper end of the throat portion 8.

The burner 7 is provided at the flame port with means for directing fuel emitting therefrom radially outwardly toward the flange 15. This means may take the form of a flame spreader or deflector 16 of steel or other suitable material formed with a conical upper end 17 and having radially directed web portions 18 fixed within the upper end of the throat portion 8 and supporting the portion 17 in spaced relation with respect to the throat 8 and flange 14 as shown. The portion 17 is so disposed that gaseous fuel must pass out of the flame port and beyond said portion 17 before it can mix with combustion air. Upon ignition, the fuel burns in a very soft diffusion type flame in the upper end of the structure and within the cup-shaped structure aforementioned, as shown in dotted lines. The flame wipes the flanges 14 and 15 as shown, and the flange 15 affords an effective draft shield preventing outage of the small flame from the effects of drafts.

In the illustrated form of the invention the flange 15 comprises an extension of a heat conductive metal sleeve 19 which is hermetically joined, as by welding, to the flange 14, and is similarly sealed at its lower end, as by silver soldering, to an annular end wall fitting 20. The fitting 20 is, in turn, sealed to the burner throat 8, as by silver soldering. It is apparent that the burner throat portion 8, flange 14, sleeve 19 and end wall 20 provide an hermetically sealed annular chamber enclosing the thermopile 6.

The illustrated thermopile 6 comprises a tubular ceramic supporting core 21 having low thermal and electrical conductivity. The core 21 is formed with spaced axially extending peripheral recesses or grooves 22, and bonded to the member 21 within the grooves 22 are a plurality of alternate P and N-type filamentary semiconductor thermoelements 23 and 24, for example P-type and N-type lead telluride thermoelements respectively. Suitable thermojunction means, for example iron contact electrodes 25 and 26 are provided at the upper and lower ends of the thermoelements 23 and 24 for connection of said elements in series circuit.

Leads 27 and 28 for the thermopile 6 may be connected respectively to the pins of a double pin glass-to-metal hermetic seal 29 to permit connection of the thermopile 6 to an external circuit. Alternatively, the negative terminal of the thermopile may be internally grounded to the metal structure, for example by soldering the conductor 28 to the sleeve 19 and/or end wall 20, the positive lead 27 being connected to the pin of a single pin glass-to-metal seal for connection, for example to a water tank anode. In the latter case the metal structure must be connected in circuit to the steel shell of the water tank (not shown), for example by bolting a mounting clamp 30 for the burner-generator assembly 5 to the tank.

The thermoelements 23 and 24 of the thermopile 6 are insulated from the tubular shell 19 by a thin layer 31 of electrical insulating and heat conductive material, for example mica. Positioning means for the thermopile 6 is also provided and may take the form of a helical compression spring 32 surrounding the burner throat portion 8 and disposed between the lower end of the ceramic sleeve 21 and the end wall fitting 20 as shown.

In the operation of the improved burner-generator assembly, the flange 15, in addition to affording a draft shield, provides, with the flange 14, heat transfer means for collecting heat from the burner flame and transferring it by conduction to the region of the hot thermojunction members 25. Because of the small cross-sectional area of the filamentary semiconductor thermoelements 23 and 24, which have much lower thermal conductivity than conventional metallic elements, and because the core 21 is of material having very low thermal conductivity, a very small flame is sufficient to provide the temperature difference between the hot thermojunctions 25 and the cold thermojunctions 26 required to generate the desired thermoelectric energy. For this reason, the improved burner-thermoelectric generator assembly is particularly well adapted to afford cathodic protection for domestic hot water heaters in which the heat input during standby periods must be restricted to a low level. As indicated in the drawing, combustion takes place well within the draft shield afforded by the flange 15, the fuel metering orifice 10 being of a size to permit only a low rate of fuel input. The necessary combustion air diffuses in from above the flame, or alternatively the flange 15 may be provided with small openings in the form of slots or holes to permit access of combustion air to the burning mixture.

The miniature non-aerated type burner is well suited to low heat input applications and offers the additional advantage of not requiring primary air entrainment below the deflector 16. Primary air inlet openings have a tendency to clog with lint in a relatively short time, and their elimination in the present structure eliminates the cause of many service calls.

While the illustrated embodiment of the invention takes the form of a unitary structure, it is obvious that the thermopile 6 may be enclosed within an hermetically sealed annular jacket which may be removably disposed about the burner 7. The illustrated form of the invention is the preferred form however.

The form of the invention illustrated and described was selected to facilitate the disclosure of the invention, rather than to limit the number of forms which it may assume. Various other modifications, adaptations and alterations may be applied to the specific form shown to meet the requirements of practice, without in any manner departing from the spirit or scope of the invention, and all of such modifications, adaptations and alterations are contemplated as may come within the scope of the appended claims.

What is claimed as the invention is:

1. A combination burner-thermoelectric generator assembly comprising a burner body formed of concentric inner and outer sleeves and an annular transverse wall joining said sleeves at one end of said inner sleeve, said inner sleeve having fuel inlet means at its other end and terminating in a flame port at said annular transverse wall, said outer sleeve being formed of heat conductive material and extending axially beyond said annular wall to afford a tubular flange in spaced coaxial relation surrounding said flame port, and an annular thermoelectric generator disposed between said inner and outer sleeves and terminating short of all portions of said annular transverse wall, said generator having hot junction means in heat transfer relation with said outer sleeve adjacent said annular wall, and said flange being positioned to afford draft protection to burning fuel at said flame port as well as to afford means for collecting heat from said burning fuel.

2. A combination burner-thermoelectric generator assembly comprising a burner body formed of concentric inner and outer sleeves and an annular transverse wall joining said sleeves at one end of said inner sleeve, said inner sleeve having fuel inlet means at its other end and terminating in a flame port at said annular transverse wall, said outer sleeve being formed of heat conductive material and extending axially beyond said annular wall to afford a tubular flange in spaced coaxial relation surrounding said flame port, a deflector adjacent said flame port and adapted to deflect fuel emitted therefrom radially toward said flange, and an annular thermoelectric generator disposed between said inner and outer sleeves and terminating short of all portions of said annular transverse wall, said generator having hot junction means in heat transfer relation with said outer sleeve adjacent said annular wall, and said flange being positioned to afford draft protection to burning fuel at said flame port as well as to afford means for collecting heat from said burning fuel.

3. A combination burner-thermoelectric generator assembly comprising a burner body formed of heat conductive concentric inner and outer sleeves and annular opposite end walls defining an annular hermetically sealed chamber, said inner sleeve having fuel inlet means at one end and a flame port at the other end thereof, said outer sleeve projecting axially beyond the end wall at said flame port to afford a tubular flange in spaced coaxial relation surrounding said flame port, and an annular thermoelectric generator disposed within said annular chamber comprising an elongated annular insulating ceramic support formed with axially extending spaced recesses, filamentary semiconductor thermoelements bonded to said support within said recesses, and thermojunction means electrically joining end portions of said thermoelements adjacent said flame port and axially inwardly of all portions of said end wall thereat to afford hot thermojunctions in heat transfer relation with said outer sleeve, said flange being positioned to afford draft protection to burning fuel at said flame port as well as to afford means for collecting heat from said burning fuel.

4. A combination burner-thermoelectric generator assembly comprising a burner body formed of heat conductive concentric inner and outer sleeves and annular opposite end walls defining an annular hermetically sealed chamber, said inner sleeve having fuel inlet means at one end and a flame port at the other end thereof, said outer sleeve projecting axially beyond the end wall at said flame port to afford a tubular flange in spaced coaxial relation surrounding said flame port, a deflector positioned adjacent said flame port and adapted to deflect fuel emitted therefrom radially toward said flange, and an annular thermoelectric generator disposed within said annular chamber comprising an elongated annular insulating ceramic support formed with axially extending spaced recesses, filamentary semiconductor thermoelements bonded to said support within said recesses, and thermojunction means electrically joining end portions of said thermoelements adjacent said flame port and axially inwardly of all portions of said end wall thereat to afford hot thermojunctions in heat transfer relation with said outer sleeve, said flange being positioned to afford draft protection to burning fuel at said flame port as well as to afford means for collecting heat from said burning fuel.

5. A burner-thermoelectric generator assembly comprising means defining a burner body having a flame port at one end, means defining an annular chamber surrounding said burner body and terminating at one end adjacent said flame port, said last-mentioned means including a heat conductive tubular flange projecting axially outwardly beyond said one end of said chamber in spaced coaxial relation surrounding said flame port, and an annular thermoelectric generator disposed within said annular chamber and having hot junction means in heat transfer relation with and disposed axially inwardly of said heat conductive tubular flange, said flange being positioned to afford draft protection to burning fuel at said flame port as well as to afford means for collecting heat from said burning fuel for transfer to said hot junction means.

6. A burner-thermoelectric generator assembly comprising means defining a burner body having a flame port at one end, means defining an annular chamber surrounding said burner body and terminating at one end adjacent said flame port, said last-mentioned means including a heat conductive tubular flange projecting axially outwardly beyond said one end of said chamber in spaced coaxial relation surrounding said flame port, and an annular thermoelectric generator disposed within said annular chamber comprising an elongated annular insulating ceramic support formed with axially extending spaced recesses, filamentary semiconductor thermoelements bonded to said support within said recesses, and thermojunction means electrically joining end portions of said thermoelements to afford hot thermojunctions in heat transfer relation with and disposed axially inwardly of said heat conductive tubular flange, said flange being positioned to afford draft protection to burning fuel at said flame port as well as to afford means for collecting heat from said burning fuel for transfer to said hot junction means.

7. A burner-thermoelectric generator assembly comprising a burner body having a heat conductive circular transverse end wall and a heat conductive coaxial tubular outwardly extending wall defining with said transverse wall an outwardly facing cup-shaped burner body end portion, said transverse wall being formed with a central outwardly directed flame port, and a thermoelectric generator having hot junction means disposed adjacent and in heat transfer relation with said cup-shaped burner body end portion and axially inwardly of all portions of said transverse wall, said tubular wall being positioned to afford draft protection to burning fuel at said flame port as well as to afford means for collecting heat from said burning fuel for transfer to said hot junction means.

8. A burner-thermoelectric generator assembly comprising a burner body having a heat conductive circular transverse end wall and a heat conductive coaxial tubular outwardly extending wall defining with said transverse wall an outwardly facing cup-shaped burner body end portion, said transverse wall being formed with a central outwardly directed flame port, a deflector adjacent said flame port positioned to deflect radially toward said tubular wall fuel emitted from said flame port, and a thermoelectric generator having hot junction means disposed adjacent and in heat transfer relation with said cup-shaped burner body end portion and axially inwardly of all portions of said transverse wall, said tubular wall being positioned to afford draft protection to burning fuel at said flame port as well as to afford means for collecting heat from said burning fuel for transfer to said hot junction means.

References Cited in the file of this patent

UNITED STATES PATENTS

| | | |
|---|---|---|
| 2,189,829 | Wunsch et al. | Feb. 13, 1940 |
| 2,236,609 | Ray | Apr. 1, 1941 |
| 2,416,455 | Ray | Feb. 25, 1947 |
| 2,494,833 | Ray | Jan. 17, 1950 |
| 2,526,112 | Biggle | Oct. 17, 1950 |
| 2,649,490 | Greenamyer | Aug. 18, 1953 |
| 2,833,843 | Jackson et al. | May 6, 1958 |

FOREIGN PATENTS

| | | |
|---|---|---|
| 256,069 | Italy | Dec. 6, 1927 |